Dec. 28, 1965 T. W. SHEARER, JR 3,226,526
WELDING GUN
Filed Dec. 13, 1962
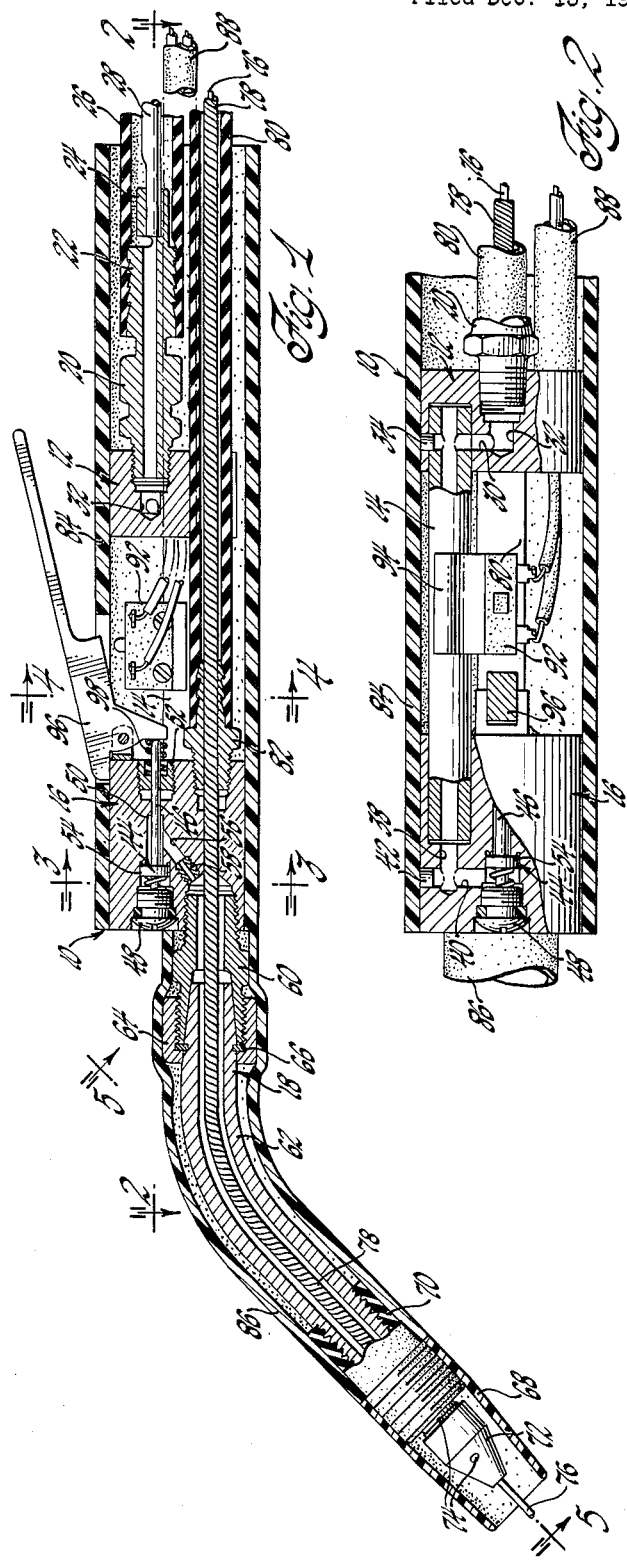
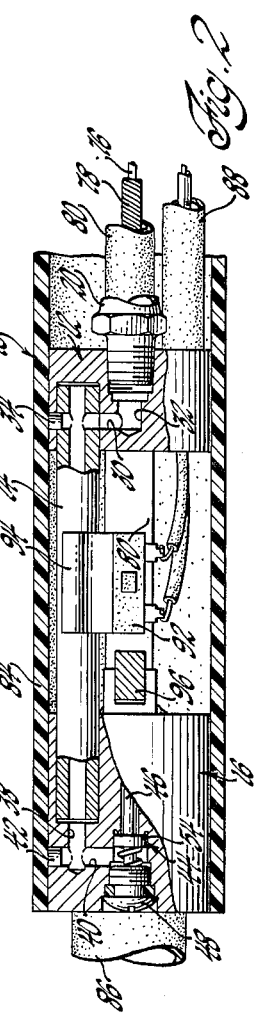
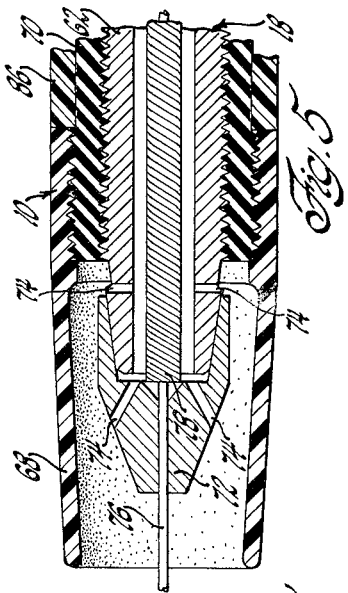
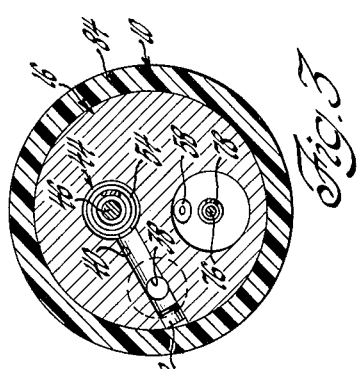
INVENTOR.
Thomas W. Shearer, Jr.
BY
W. S. Pettigrew
ATTORNEY 3,226,526
WELDING GUN
Thomas W. Shearer, Jr., Auburn Heights, Mich., assignor to General Motors Corporation, Detroit, Mich., a corporation of Delaware
Filed Dec. 13, 1962, Ser. No. 244,359
1 Claim. (Cl. 219—130)

This invention relates to welding guns and more particularly to a gun adapted to provide a gas shielded welding arc.

One feature of this invention is that it provides an improved arc weldiing gun. Another feature of the invention is that it provides an improved welding gun adapted for gas shielded arc welding with a consumable electrode which is advanced during the consumption thereof by feeding means, with the gun including first means for controlling the flow of the shielding gas, second means controlling the operation of the feeding means, and selectively operable third control means for simultaneously operating the first and second control means. Still another feature of this invention is that it provides improved means for cooling the power cable connected to the gun.

These and other features of the invention will be more apparent from the following specification and drawings wherein:

FIGURE 1 is a sectional view of a weldiing gun according to this invention;

FIGURE 2 is an enlarged fragmentary partially broken away sectional view taken generally along the plane indicated by line 2—2 of FIGURE 1;

FIGURE 3 is an enlarged sectional view taken generally along the plane indicated by the line 3—3 of FIGURE 1;

FIGURE 4 is an enlarged sectional view taken generally along the plane indicated by line 4—4 of FIGURE 1; and FIGURE 5 is an enlarged sectional view taken generally along the plane indicated by line 5—5 of FIGURE 1.

As is well-known, arc welding apparatus of the type employing a consumable electrode and an envelope of inert shielding gas around the welding arc have necessarily included a plurality of controls, such as for the inert gas supply, the electrode feeding means, and the welding power supply. In the past, although these parts of the apparatus are required to function concurrently, they have been independently controlled. Furthermore, since the inert gas supply control valve is usually remote from the welding gun and workpiece, and connected to the gun by a length of tubing, inconvenience is caused when it becomes necessary to frequently manipulate the valve, and a substantial interval of time is required for the gas to enter the gun. This invention overcomes these difficulties by providing a gas control valve in the gun itself, which valve is manually operated simultaneously with some other control means, such as that associated with the electrode fedeing means.

Referring particularly to FIGURE 1, a welding gun 10 includes a main body portion of copper or other electrical conducting material, which body includes a block 12 connected by a tube 14 to a second block 16 which is threadedly connected to a nozzle and tube assembly designated generally as 18. As seen in FIGURES 1 and 2, block 12 threadedly receives an electrically conductive fitting 20 having a nipple 22 terminating in a partial flange 24. Tubing 26, which is connected to a source of inert gas such as helium or argon, is slipped over nipple 22, and a power cable 28, which is connected to a conventional welding power supply, is enclosed substantially throughout its length by tube 26 and is clamped at its end within partial flange 24.

As seen best in FIGURE 2, block 12 is provided with a gas passage formed by a lateral bore 30 extending from one side of the block through tube 14 to intersect a central bore 32 extending axially of the fitting 20. Bore 30 is plugged at 34, and the passage thus continues through tube 14 into block 16, where a bore 38 extends axially of tube 14 and intersects a laterally extending bore 40 drilled upwardly from the side of the block to intersect a central multi-shouldered bore which receives a valve assembly 44, FIGURE 3. Bore 40 is plugged at 42. Valve assembly 44 includes a plunger 46 having one end received in a sealed and partially bored seat cap 48 and the other end thereof extending through a bore 50 and a plug 52 in block 16 to terminate outside the block. A valve spool 54 formed on plunger 46 seats a spring which biases the spool against a valve seat provided at the entrance of bore 50. Bore 50 intersects a downwardly extending bore 56 tapped to receive a threaded orifice element 58.

Nozzle and tube assembly 18 includes a conductive fitting 60 threaded into block 16 at one end thereof and including a tapered bore opening to its other end and receiving the tapered end of a bent conductive tube 62, with a nut 64 being seated against a retaining ring 66 and being threaded over fitting 60 to hold the tube within the fitting. The tightening of nut 64 over fitting 60 causes a pressed engagement of the tapered end of tube 62 within fitting 60 to form a seal. Tube 62 may be rotated within fitting 60 without destroying the seal. As seen in FIGURE 5, assembly 18 terminates in a nozzle arrangement including a nozzle cover 68 threaded over an insulative coupling element 70 which is threaded to tube 62, and a nozzle 72 is threaded over the extreme end of tube 62. Referring again to FIGURE 1, it is seen that bore 56 connects with a chamber provided in block 16 at the end of fitting 60 so as to continue the gas passage through fitting 60 and tube 62 to the end thereof, where a plurality of bores 74 in nozzle 72 and tube 62 continue the gas passage to within nozzle cover 68 and thus to the atmosphere, FIGURE 5.

In FIGURE 1, a consumable electrode 76 and a surrounding spiral support wire 78 extend from wire feeding means, not shown, and are enclosed by tubing 80 which enters one end of the gun and passes under block 12 through a notch provided therein and has its end slipped over a nipple of a fitting 82 threaded into block 16. Electrode 76 and spiral wire 78 pass through fitting 82, block 16, fitting 60, and tube 62 to nozzle 72 where the spiral wire 78 terminates and the electrode passes through the nozzle in contacting relation therewith, FIGURE 5.

As is readily seen from FIGURE 1, welding current passes from cable 28 through fitting 20 to the block 12 and thence through tube 14 to the block 16 which passes the current to fittings 60, tube 62, nozzle 72 and thus to electrode 76. The entire conductive body of the gun is covered with protective insulating material, particularly a rigid cylinder 84 over blocks 12 and 16, and a flexible tube 86 over assembly 18.

An electrical conduit 88 of the wire feeding control means enters the gun and passes through a third bore 90 in block 12 so as to have the leads thereof connected to an insulative body switch 92 mounted on a bracket 94 which is in turn mounted on tube 14, FIGURE 4. A hand lever 96 of insulative material pivotally mounted on block 14 has an ear thereof engaging the end of plunger 46 and a shoulder thereof overlying the actuator of the switch 76. Spring 98 biases lever 96 into an inoperative position as shown in FIGURE 1.

The inert gas supply normally fills tube 26 and the gas passage through block 12, tube 14 and block 16, and the gas is prevented from reaching the nozzle only by valve assembly 44. When lever 96 is manually depressed, plunger 46 will be moved axially to displace the spool 54 from the valve seat and allow gas to pass from bore 40 into bores 50 and 56 and thence through tube 62 to nozzle 72. This operation occurs simultaneously with a closing of the switch 92 so as to cause the remote wire feeding means to operate and advance electrode 76 toward the workpiece. Thus it can be seen that due to the proximity of the valve 44 to the nozzle, no appreciable delay occurs in the flow of the gas from the remote supply thereof to the work area. It will also be seen that steps in operation are eliminated by means of a common control for the wire feed apparatus and the gas supply. It will be understood that additional control means may be located in the gun to be operated by lever 96, such as a switch for a relay circuit to operate the welding power supply.

In addition, it will be seen that another distinct advantage is provided in this invention in the arrangement of the power cable 28 within the gas supply tube 26. The flow of gas through the tube provides a highly efficient source of cooling for the power cable that has in the past required elaborate fittings and tubing for a separate and otherwise non-functional supply of cooling water or air.

Thus a new and improved welding gun is provided.

I claim:

In apparatus for providing a gas shielded welding arc between a consumable electrode and a workpiece and including a source of power, electrode moving means, and a source of gas, a welding gun comprising, an elongated conductive handle portion, a conductive neck portion, means connecting one end of said handle portion with said neck portion, means connecting said power source to said handle portion, an electrode passage extending from the other end of said handle portion therethrough and through said connecting means to and centrally through said neck portion and including means for establishing contact with said electrode, a nozzle mounted on the distal end of said neck portion at the outlet of said electrode passage, a gas passage connected to said source of gas and extending from said other end of said handle portion substantially therethrough codirectionally with and spaced from said electrode passage, said gas passage including an offset portion providing space for reception of a control lever generally centrally of said handle portion, a control lever mounted within said space and including a pair of operating portions, a gas control valve interposed within said gas passage for controlling passage of said gas therethrough and being operable by one portion of said lever, second control means associated with said electrode moving means mounted on said body adjacent said lever and being operable by the other portion thereof, a cross passage connecting the downstream end of said gas passage with said electrode passage to continue passage of gas through said electrode passage to said nozzle, and a removable flow control element insertable through said connecting means into said cross passage for providing a predetermined rate of said gas flow to said nozzle upon operation of said valve.

References Cited by the Examiner
UNITED STATES PATENTS

| | | | |
|---|---|---|---|
| 2,769,894 | 11/1956 | Rives | 219—130 |
| 2,806,125 | 9/1957 | Miller | 219—130 |
| 3,042,791 | 7/1962 | Reeh | 219—75 |
| 3,093,728 | 6/1963 | Adamson | 219—130 |
| 3,112,392 | 11/1963 | Orr et al. | 219—130 |

RICHARD M. WOOD, *Primary Examiner.*